No. 756,121. PATENTED MAR. 29, 1904.
J. R. LAZARUS.
GRAIN SEPARATOR.
APPLICATION FILED FEB. 6, 1903.
NO MODEL. 5 SHEETS—SHEET 1.

Witnesses
J. R. Lazarus, Inventor
by C. A. Snow & Co.
Attorneys

No. 756,121. PATENTED MAR. 29, 1904.
J. R. LAZARUS.
GRAIN SEPARATOR.
APPLICATION FILED FEB. 6, 1903.
NO MODEL. 5 SHEETS—SHEET 2.

Witnesses J. R. Lazarus, Inventor:
by C. A. Snow & Co.
Attorneys

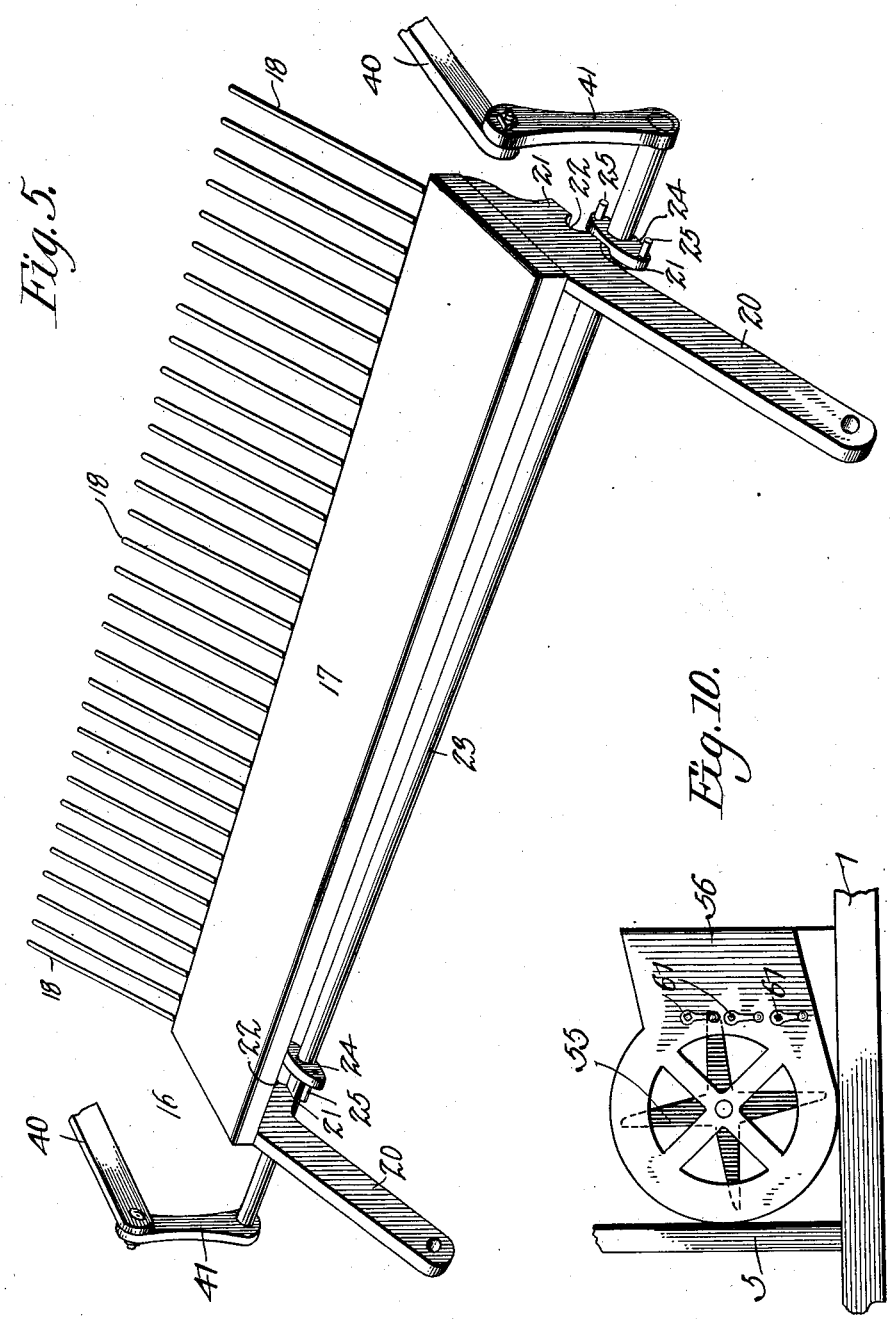

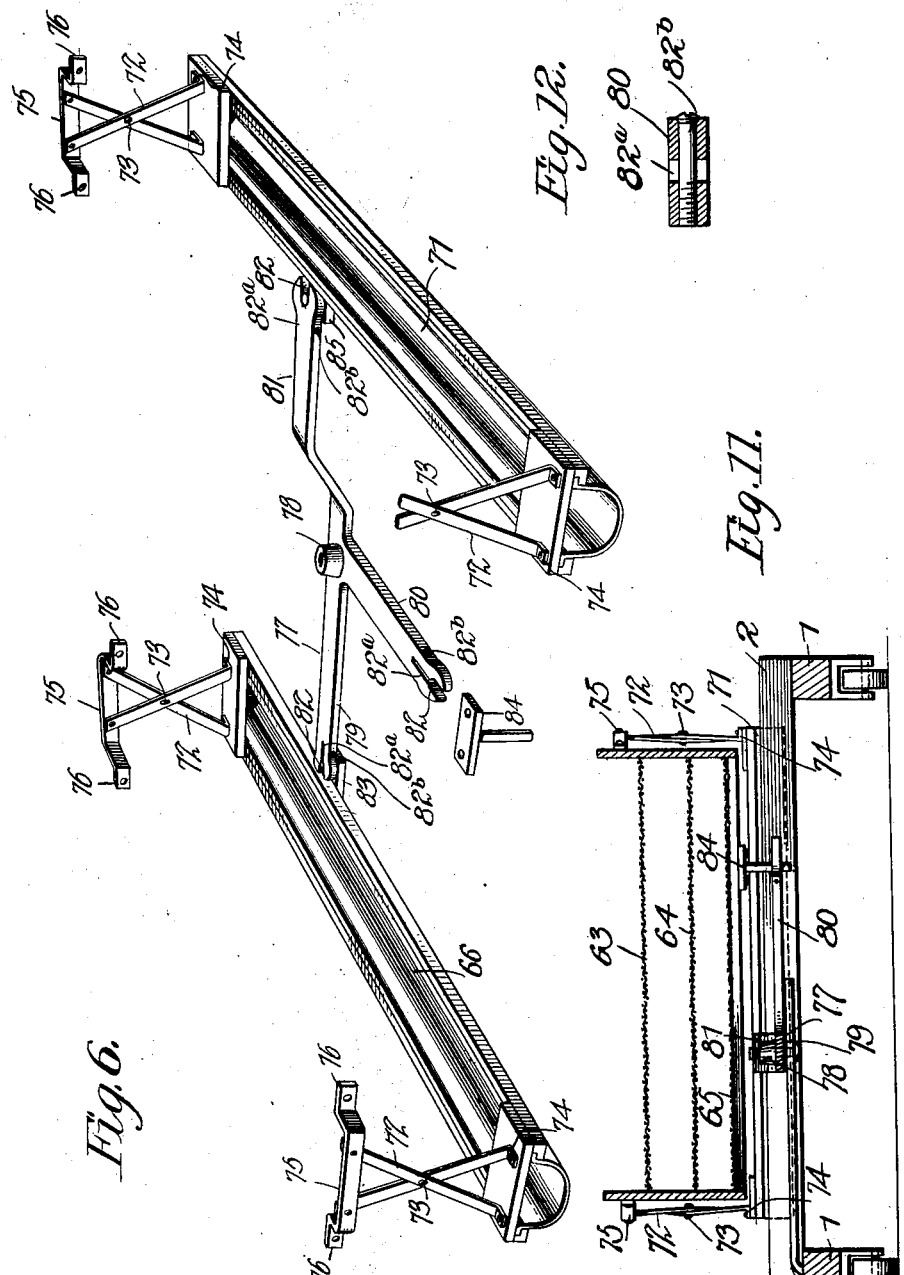

No. 756,121. PATENTED MAR. 29, 1904.
J. R. LAZARUS.
GRAIN SEPARATOR.
APPLICATION FILED FEB. 6, 1903.
NO MODEL. 5 SHEETS—SHEET 5.

Witnesses
J. R. Lazarus, Inventor:
by C. A. Snow & Co
Attorneys

No. 756,121. Patented March 29, 1904.

UNITED STATES PATENT OFFICE.

JOHN R. LAZARUS, OF SHOENERSVILLE, PENNSYLVANIA.

GRAIN-SEPARATOR.

SPECIFICATION forming part of Letters Patent No. 756,121, dated March 29, 1904.

Application filed February 6, 1903. Serial No. 142,173. (No model.)

*To all whom it may concern:*

Be it known that I, JOHN R. LAZARUS, a citizen of the United States, residing at Shoenersville, in the county of Northampton and State of Pennsylvania, have invented a new and useful Grain-Separator, of which the following is a specification.

This invention relates to grain-separators; and it has for its object to provide a machine of this class which shall possess superior advantages in point of simplicity, durability, and general efficiency.

With these ends in view the invention consists in the improved construction, arrangement, and combination of parts which will be hereinafter fully described, and particularly pointed out in the claims.

Figure 1:
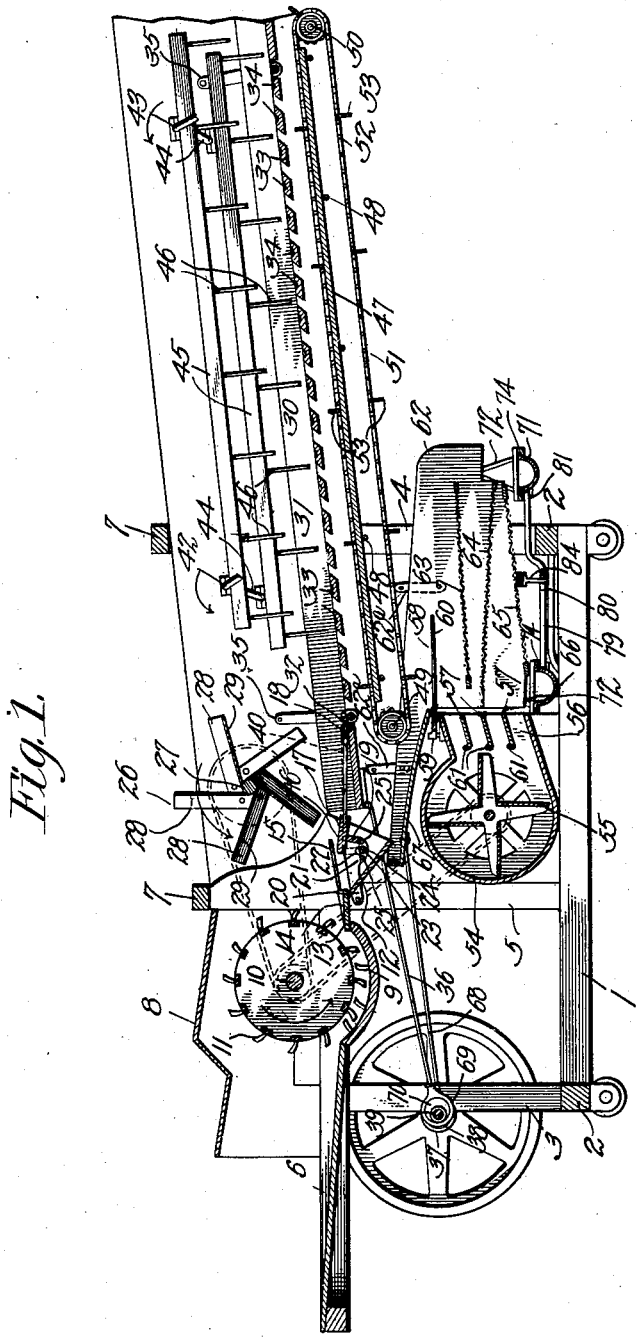
Figure 2:
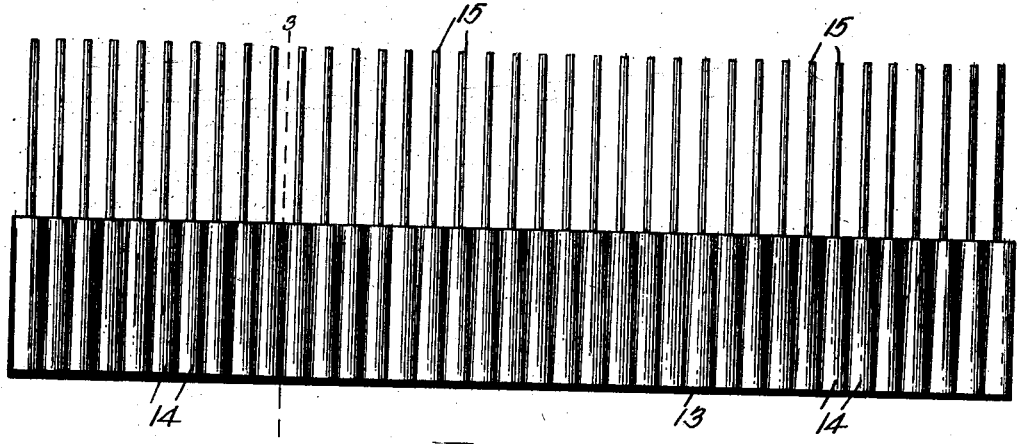
Figure 3:
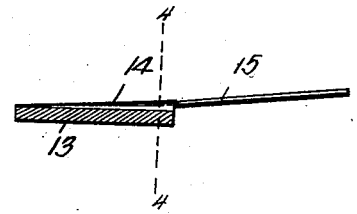
Figure 4:
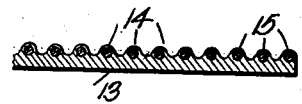
Figure 7:
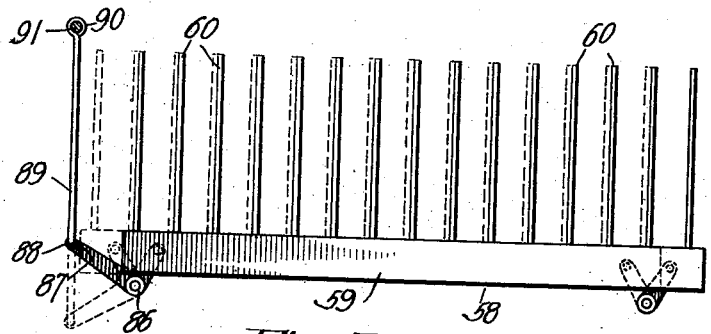
Figure 8:
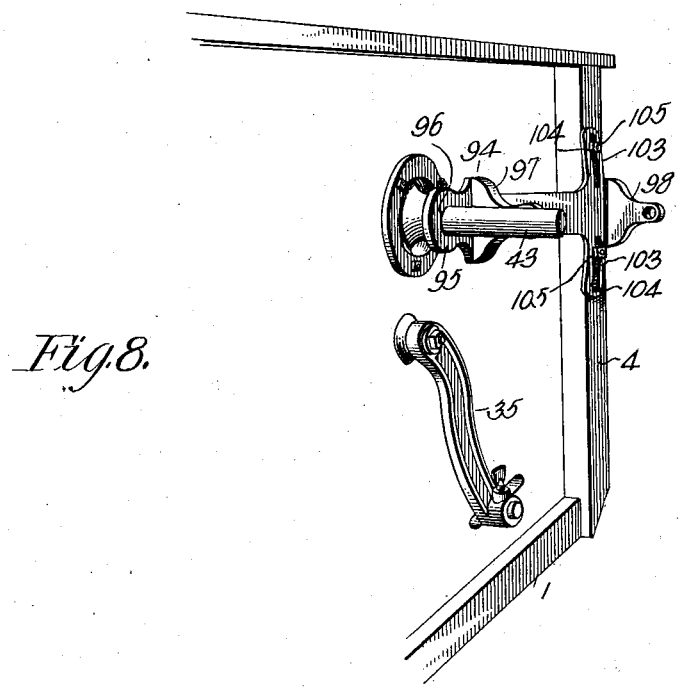
Figure 9:
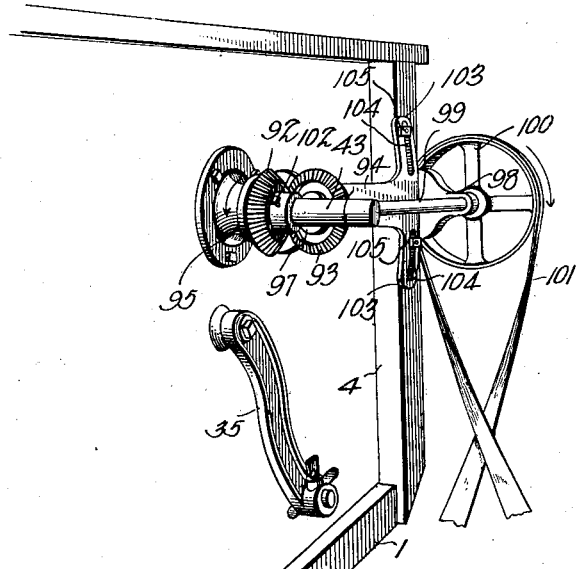

In the accompanying drawings, Figure 1 is a longitudinal sectional view taken through as much of a grain-separator constructed in accordance with my invention as is required to illustrate the invention. Fig. 2 is a plan view of the separating-grate which forms a part of the invention. Fig. 3 is a sectional view of the separating-grate, taken on the line 3 3 in Fig. 2. Fig. 4 is a sectional view of a portion of said separating-grate, taken on the line 4 4 in Fig. 3. Fig. 5 is a perspective detail, on an enlarged scale, of the separating-rake and related parts. Fig. 6 is a perspective detail view of the grain and tailings spouts, showing the means for suspending said spouts from the shoe and for communicating a reciprocating movement to the said spouts transverse to the movement of the shoe. Fig. 7 is a detail plan view of a portion of the chaff-rake. Figs. 8 and 9 are perspective details showing the means for communicating motion to the longitudinally-movable bars constituting the straw-rack. Fig. 10 is a detail side view of the fan-casing, showing the ends of the shafts carrying the valves. Fig. 11 is a transverse sectional view of the lower part of the shoe, showing also the adjacent part of the casing of the machine and part of the means for transmitting motion to the transversely-reciprocating grain-tailings spout. Fig. 12 is a sectional detail view, on an enlarged scale, taken through the end of the arm 80 to show the bolt 82$^b$.

Corresponding parts in the several figures are indicated by similar characters of reference.

The frame structure of my improved grain-separator comprises side sills 1, front and rear sills 2, front uprights 3, rear uprights 4, intermediate uprights or legs 5, horizontal brackets 6, and transverse top pieces 7. The foregoing are alluded to merely as being the principal fixtures of the frame. Additional braces or frame-pieces are to be used wherever needed and will be specially referred to when necessary. A casing will also be provided which will extend beyond what has here been designated as the "rear" uprights 4, said uprights being the rear uprights only in their relation to that part of the machine which will be herein shown and described, it being deemed unnecessary to illustrate or to particularly describe the rear portion of the casing proper of the machine, which is not included in my invention.

The brackets 6 support a casing 8, containing the concave 9, which is of ordinary construction. Said casing is also provided with bearings for the shaft 10 of the threshing-cylinder 11, which is constructed, mounted, and driven in the usual manner.

The legs or uprights 5 support an inclined board 12, and the rear edge of the concave 9 supports the front edge of a casting 13, additionally supported upon the upper ends of the legs 5 and consisting of a plate provided on its upper face with a plurality of parallel inclined or wedge-shaped ribs 14, the incline of which is in an upward and rearward direction. Each of these ribs is cast around a finger 15, consisting of a round iron bar of suitable dimensions, extending rearwardly. These round fingers coöperate to constitute a separating-grate, between the fingers or bars of which loose grain may pass freely in a downward direction, a portion of said grain dropping upon the inclined board 12, whereby it is guided to the fanning-mill, as will be hereinafter described.

The casing 8, within which the cylinder and concave are confined, is provided at its front end with the usual feed-opening, and the rear portion of said casing is extended, so as to confine the delivery of the threshed grain from the cylinder and concave, so that it may be delivered in the proper direction. The upper edge of the inclined board 12 is disposed adjoining and in contact with the rear edge of the casting 13, which is supported, as stated, upon the upper ends of the legs 5. It follows that all material discharged from between the cylinder and the concave must necessarily pass over the separating-grate, the inclined ribs 14 of which offer no obstruction to the passage of said material in an upward and rearward direction, but serve, on the contrary, to break it up and to loosen it before it passes onto the separating-fingers 15, between which the loose grain is permitted to drop, as already described. It is at this point that by far the largest proportion of the grain is separated from the straw, as is well known and will be readily understood.

16 designates what I term the "separating-rake," which comprises a board 17, into the rear edge of which a plurality of rake-teeth or bars 18 are driven, said rake-teeth extending rearwardly a suitable distance over the straw-rack. To the under side of the board or rake-head 17 is secured a transverse deflecting-board 19, extending downward, as shown, so as to intercept the grain, which is discharged violently in a rearward direction by the threshing-cylinder. It will of course be understood that the deflecting-board 19 is not disposed directly in the path of the discharge from the threshing-cylinder. Nevertheless the impact given to the grain as it is delivered from the threshing-cylinder will be sufficiently strong to carry a considerable portion thereof in a rearward direction even after it drops between the grate-bars 15, and the deflector 19 is consequently found extremely useful in intercepting such grain and deflecting it downwardly to the fanning-mill.

The rake-head 17 is provided at its ends with rearwardly-extending arms 20, having pivotal connection with the legs or uprights 5. Said arms are provided on their under sides with projections 21, extending downwardly and spaced apart by an intermediate recess 22.

23 designates a rock-shaft, the ends of which are extended through the walls of the casing, where they are provided with supporting boxes or bearings. Securely mounted upon said shaft are castings or collars 24, having pins or projections 25, which are disposed directly below the downward projections 21 of the arms 20. It follows that when the shaft 23 is rocked or oscillated in its bearings the pins 24 will alternately engage the projections 21, and in this manner a vertical reciprocating or vibratory movement will be imparted to the rake 16. The front edge of the rake-head 17 extends below the rear ends of the fingers or grate-bars 15, and while disposed closely contiguous thereto does not at any time during the operation of the machine come in contact with said grate-bars. The method of transmitting and imparting said movement will be hereinafter more fully described.

26 designates a rotary beater which is disposed above the grate 16 and which is composed of a shaft 27, carrying heads or spiders 28, the arms of which are connected by plates 29, which are preferably constructed of sheet metal. In my preferred construction the heads or spiders at the ends of the shaft 27 are each provided with five arms, thus dividing the beater into five equal compartments, which receive the straw discharged from the threshing-cylinder and deliver the same onto the rake 16 five times to each revolution of the beater. The material discharged by the threshing-cylinder against said beater is thrown against the latter with a considerable degree of force, which assists in loosening the grain, so that when the mixed straw and grain is delivered upon the vibratory rake it will be readily separated and the grain will be suffered to pass between the rake-teeth and in a downward direction to be intercepted by means which are yet to be described, The straw-shaker or straw-rack 30 of my improved machine consists of a trough, the sides of which, 31, are connected at their front ends by a piece of flooring 32, over which the teeth 18 of the rake 16 extend. In rear of said bottom or flooring piece the sides 31 are connected by a plurality of slats 33, suitably spaced apart to permit the grain which separates from the straw to drop between them, the upper sides of said slats being provided with grooves 34 to assist in promoting the separation of the grain from the straw. The straw-rack is suspended from the deck of the casing by means of hangers 35, and a reciprocating motion in a longitudinal direction is imparted thereto by means of an eccentric-rod or pitman 36, one end of which is suitably connected with the flooring 32 of said straw-rack, while its opposite end has an eccentric-strap 37, engaging a disk 38, mounted eccentrically upon a shaft 39, having its bearings in the front uprights 3, and to which motion may be contributed in any suitable manner from the shaft of the threshing-cylinder or from any other operative part of the machine, whereby it may be conveniently and properly speeded. The forward hangers 35 of the straw-rack are connected, as best seen in Fig. 5, by means of links 40 with arms 41, extending upwardly from the rock-shaft 23, through the medium of which a vibratory motion is imparted to the rake 16, as already described. The said rake will thus move in unison with the straw-rack and will serve after a fashion to counterbalance the latter, thereby facilitating the operation and causing the device to operate with smoothness and uniformity.

42 and 43 designate a pair of crank-shafts, which are journaled in suitable bearings transversely between the sides of the casing, said crank-shafts being provided with equal numbers of correspondingly-disposed cranks 44. These cranks of the forward and rear shafts are connected in pairs by the overhead rakes, consisting of bars 45, having downward-extending teeth 46 of suitable length. Suitable means are to be provided whereby the crank-shafts 42 and 43 will be operated in unison, thereby imparting to the rake-bars 25 a gyratory movement in the direction indicated by the arrows, whereby the teeth of said rake-bars shall be caused to stir and agitate the straw passing over the rack and also at the same time to assist materially in feeding the said straw in a rearward direction.

47 designates a grain-floor which is disposed between the sides of the casing of the machine underneath the straw-rack. The latter, it will be observed, is inclined in a rearward and upward direction, so as to retard the passage or delivery of the straw rearwardly through the casing of the machine. The grain-floor 47 is likewise inclined upwardly and rearwardly and is for the purpose of receiving the grain which is separated from the straw in its rearward passage over the shaker and for conveying the same to the fanning-mill. The floor 47 is supported upon a plurality of transverse bolts 48, which connect the sides of the casing of the machine, thus serving to bind the said casing firmly together and to brace it in a very substantial manner. At the ends of the grain-floor are disposed shafts 49, carrying pulleys or rollers 50, serving to support an endless carrier 51, which is composed of an apron 52, carrying slats 53. Said endless carrier, which moves in the direction indicated by an arrow and for the operation of which suitable well-known means are to be provided, serves to convey the grain which drops upon the grain-floor to the fanning-mill, as will be readily understood. It is obvious that along with the grain broken ears, chaff, short straw, and the like will drop upon the grain-floor, all such material being carried to the fanning-mill, as will be readily understood, to be there separated.

The casing 54 of the fan 55 is disposed in rear of the legs or uprights 5 and is provided with a rearwardly-extending discharge-throat 56, in which are disposed a plurality of pivoted valves 57, by means of which the direction of the blast created by the rotary fan 55 may be regulated. The upper rear edge of the throat 56 of the fan-casing supports what I call the "chaff-rake" 58, which is composed of a head 59, having rearwardly-extending teeth 60, said head being mounted and supported in such a manner as to be capable of transverse or lateral movement with relation to the frame of the machine and the fan-casing. The shafts 61, upon which the valves 57 are mounted, are extended beyond the casing and are provided with means, such as handles or ends squared to receive handles, by means of which they may be readily manipulated.

62 designates the shoe of the fanning-mill, which is supported by suitable hangers, as 62$^a$, whereby it is permitted to have the necessary freedom of movement. The shoe contains an upper or chaff sieve 63, a lower or grain sieve 64, and a bottom screen 65, which latter discharges the clean grain into the delivery-spout 66, which is disposed at the front end of the shoe, in which direction the screen 65 is inclined. The force of the blast to the several screens or sieves may be regulated by means of the correspondingly-disposed valves. I desire it to be understood that the number of screens or sieves and of the valves corresponding therewith may be increased or reduced whenever desired if the efficiency of the machine shall be considered to be promoted by such increase or reduction. I have, however, here shown what I consider the most advantageous construction and arrangement both as regards the number and the relative disposition of these sieves or screens and the valves coöperating therewith.

The shoe 62 receives its reciprocatory movement by means of an eccentric-rod connected with the forwardly-extending top portion 67 of said shoe. This eccentric-rod, which is designated 68, has a strap 69 engaging an eccentric 70 upon the shaft 39.

71 designates the tailing-spout, which is disposed at or near the rear end of the shoe 62 and which, as well as the grain-spout 66, is flexibly connected with the machine. The connecting means for each end of each of the said spouts, as illustrated in detail in Fig. 6 of the drawings, consist of a pair of flat steel straps 72, crossing each other, like the letter X, and connected at the point of intersection by means of a rivet 73. Suitably connected to the lower ends of the straps 72 are castings 74, which are also connected with the frames of the spouts. The upper ends of the straps 72 are connected by U-shaped castings 75, having laterally-extending flanges 76, whereby they are bolted or otherwise firmly secured to the casing of the machine, the said U-shaped castings serving to space the suspending-straps 72 sufficiently from the sides of the machine to enable the spouts to vibrate freely transversely to the direction of the reciprocatory movement of the shoe-casing. In order to impart this transverse vibratory motion to the spouts, I provide a rocker 77, having an annularly-flanged perforation 78, whereby it is pivotally mounted upon the frame of the machine, a suitable pin or bolt being provided for the purpose. This rocker is provided with three radiating arms 79, 80, and 81, the outer ends of which have slots 82, adapted to engage castings 83, 84, and 85, which are connected, respectively, with the grain-spout 66, the tailings-spout 71, and with the under side of the shoe 62. It will be clearly evident that the castings referred to are capable of moving slidingly in their respective slots, thus securing the necessary play or freedom of movement. The slots 82 terminate at their inner ends in comparatively narrow slits 82ª, and the arms have threaded perforations in which are seated bolts 82ᵇ, whereby the slots in the ends of the arms may be compressed in order to take up and compensate for wear. When the shoe is reciprocated longitudinally by the means already described, it will impart to the rocker 77 an oscillating motion whereby, as will be readily understood, the grain and tailing spouts are vibrated transversely to the movement of the shoe. It is obvious that a loose or free connection is essentially necessary for the reason that the rocker is mounted in stationary bearings, while the shoe carrying the vibratory spouts reciprocates. This free or loose connection is successfully attained by the construction which has just been shown and described.

The chaff-rake 58, which has already been described as being mounted transversely slidably upon the fan-casing and which extends over the open or receiving portion of the shoe, is connected with one end of a bell-crank 86, which is seen in Fig. 7 of the drawings, and the other arm of which has an opening 87, engaging the hooked end 88 of a rod 89, the opposite end of which has an eye 90 connected by a bolt 91 with the side of the shoe-casing. It will be readily understood that when the said shoe-casing reciprocates a transverse reciprocating motion is imparted to the chaff-rake, which is useful in breaking up the chaff, loose straw, and other material which is deposited thereon along with the grain, thereby greatly aiding and assisting in the separation of the grain from the chaff when the mixture passing into the casing of the shoe comes under the influence of the blast discharged from the rotary fan. The greater portion of the chaff, trash, and loose straw will be blown through the tail end of the shoe above the chaff-sieve 63, the tailings from the latter and from the lower sieve 64 will drop into the tailings-spout, while the clean grain will pass from the screen 65 to the grain-spout 66 and be delivered by the latter into receptacles suitably disposed for this purpose.

The straw-carrier of the machine, which practically comprises the rake-bars 45, connecting the cranks 44 of the shafts 42 and 43, is preferably driven by means of miter-gearing comprising bevel-gears 92 and 93, the former of which is mounted upon the shaft 43.

94 designates a casting having a lug 95, provided with a central opening 96, engaging the shaft 43, which has a bearing in said perforation. The casting 94 is also provided with lugs or flanges 97 and 98, having bearings for a shaft 99, the inner end of which carries the bevel-gear 93 and the outer end of which carries a band-wheel 100, to which motion is transmitted, by means of a belt or band 101, from the source of power either directly or, as is usually the case, through the medium of other movable parts of the machine. After the casting 94 has been placed in position engaging the shaft 43 the bevel-gear 92 is placed in position and is mounted securely upon said shaft 43 by means of a set-screw 102. The shaft 99 and bevel-gear 93 are then placed in position, said bevel-gear 93 being placed in mesh with the bevel-gear 92 and mounted securely upon the shaft 99. The casting 94 is provided with upwardly and downwardly extending arms 103, having slots 104 to receive bolts 105, by means of which it is connected adjustably with the frame of the machine, said frame being capable of swinging upon the shaft 43 as a center, as will be readily understood. By this means slack in the belt 101 may be taken up at any time, and by the means just described I avoid the use of mule-pulleys, and by the gearing described motion may be transmitted to the straw-carrier in a simple and perfect manner.

From the foregoing description, taken in connection with the drawings hereto annexed, the operation and advantages of my improved grain-separator will be readily understood. The bundles of grain are fed into the machine in the usual manner, the bands being cut either by hand or by mechanism provided for the purpose. Passing between the threshing-cylinder and the concave the threshed grain is forcibly thrown against the rotating beater, a large portion of the loose grain being, however, suffered to pass between the fingers or grate-bars 15 downwardly to the forward extension 67 of the shoe of the fanning-mill, which is floored so as to deliver the grain into the fanning-mill. The shoe 62 embraces the sides of the fan-casing, as will be readily understood, the shafts of the valves 57 being disposed at a point where they will not interfere with the reciprocatory movement of the shoe. The loose grain, chaff, and other material which passes between the grate-bars will be deflected in the proper direction by the deflecting-boards 12 and 19, which latter, as stated, is permanently attached to the under side of the head of the vibrating separating-rake 16. The latter receives the mixture of tangled straw, grain, chaff, &c., which is discharged by the revoluble beater 26 and subjects the same to a vibratory movement, whereby it is tossed and disentangled, so that a considerable portion of the grain will escape onto the floor 32 at the front end of the straw-shaker and be delivered in a forward and downward direction to the fanning-mill. The straw as it passes over the shaker is continually agitated and disentangled by the teeth of the gyratory rake-bars 45, which coact to feed the straw in a rearward direction to the tail end of the machine, while the grain and valuable material escapes between the slats of the shaker onto the grain-floor underneath, whereby it is carried by the fanning-mill. The laterally-reciprocating chaff-rake, upon which all the material is discharged, permits the grain, which is heavy, to pass freely between the teeth thereof, while the chaff and trash is broken up and disentangled to such an extent that it will be readily acted upon by the blast from the fan and be blown out through the tail end of the mill. The grain after being subjected to the action of the blast during its passage through the several sieves finally passes from the bottom screen into the delivery-spout, while the tailings are caught by the tailings-spout and disposed of in any suitable manner.

It will be observed that I have given little attention to the framing or casing of my improved machine, the construction of which will be readily understood by the skilled mechanic familiar with this class of devices. I would also have it understood that while I have in the foregoing described a simple and preferred form of my invention I do not limit myself as regards the structural details of the same, but reserve to myself the right to all changes, alterations, and modifications which may be resorted to within the spirit and scope of my invention and without detracting from the utility or efficiency of the same.

Having thus described my invention, I claim—

1. In a grain-separator, a separating-grate disposed in rear of the threshing-cylinder and comprising a casting having upwardly and rearwardly extending wedge-shaped ribs, and prongs extending rearwardly from said ribs.

2. In a grain-separator, a separating-grate disposed in rear of the threshing-cylinder and comprising a casting provided on its upper side with a plurality of wedge-shaped ribs, and rearwardly-extending prongs of wrought-iron cast into and extending rearwardly from said ribs.

3. In a grain-separator, a separating-rake comprising a rake-head, rearwardly-extending prongs and arms attached to the ends of the rake-head and extending forwardly, pivotal supporting means for the front ends of said arms, and a deflecting-board secured to the under side of the rake-head.

4. In a grain-separator, a separating-grate disposed in rear of the cylinder and supported upon the rear edge of the concave, a separating-rake having forwardly-extending, pivotally-supported arms, the head of said rake extending below the rear ends of the fingers of the grate, a deflecting-board depending from the rake-head, a deflecting-board disposed below the separating-grate, and means for imparting to the separating-rake a vertical vibratory motion.

5. In a grain-separator, the separating-rake having forwardly-extending pivotally-supported arms provided with downward extensions, spaced apart, in combination with a rock-shaft disposed below said arms, castings mounted securely upon said rock-shaft and having laterally-extending pins engaging the downward extensions of the rake-supporting arms, a straw-shaker supported by hangers, means for reciprocating said straw-shaker, cranks extending radially from the rock-shaft below the rake-supporting arms, and link connections between said cranks and the hangers of the straw-shaker.

6. In a grain-separator, a longitudinally-reciprocating shoe, in combination with transversely-reciprocating spouts, and supporting means for said spouts comprising elastic straps crossing each other and connected at the point of intersection, L-shaped castings at the lower ends of said straps connected with the frames of the trough, and U-shaped supporting-yokes having laterally-extending flanges secured to the sides of the machine and supporting the upper ends of the flexible straps at a suitable distance from the sides of the shoe.

7. In a grain-separator, the combination with a longitudinally-reciprocating shoe, of transversely-reciprocating spouts and flexible supporting means, spaced at their upper ends from the sides of the shoe and connected at their lower ends with the frames of the spouts.

8. In a grain-separator, the combination with a longitudinally-reciprocating spout, of spouts flexibly connected with and carried by the side of the machine, and means for transmitting from the shoe to said spouts a transversely-reciprocating motion.

9. In a grain-separator, a longitudinally-reciprocating shoe, a grain-spout and a tailings-spout flexibly connected with and carried by the side of the machine, a rocker having vertical trunnions whereby it is mounted in the frame of the machine, and radially-extending slotted arms and castings connected respectively with the spouts and with the under side of the shoe and loosely engaging the slots in the arms of the hopper.

10. In a grain-separator, a longitudinally-reciprocating shoe, a grain-spout and a tailings-spout flexibly connected with and carried by the side of the machine, a rocker having means whereby it is mounted in the frame of the machine and provided with radially-extending arms provided with slots at their outer ends, said slots terminating in narrow slits, said arms being also provided with transverse-threaded perforations, bolts mounted in said perforations whereby the slotted ends of the arms may be compressed, and castings connected respectively with the spouts and with the under side of the shoe and loosely engaging the slots in the arms of the rocker.

In testimony that I claim the foregoing as my own I have hereto affixed my signature in the presence of two witnesses.

JOHN R. LAZARUS.

Witnesses:
CHARLES ROCKEL,
ALFRED J. STERNER.